G. A. McCORMACK.
STUD FOR SNAP FASTENERS.
APPLICATION FILED APR. 6, 1918.

1,273,513.

Patented July 23, 1918.

Inventor
George A. Mc. Cormack
By William B. H. Down
Attorney

UNITED STATES PATENT OFFICE.

GEORGE A. McCORMACK, OF MEDFORD, MASSACHUSETTS, ASSIGNOR TO FRED JOY, OF WINCHESTER, MASSACHUSETTS.

STUD FOR SNAP-FASTENERS.

1,273,513.    Specification of Letters Patent.    Patented July 23, 1918.

Application filed April 6, 1918. Serial No. 227,126.

*To all whom it may concern:*

Be it known that I, GEORGE A. McCORMACK, a citizen of the United States, and residing at 36 Cherry St., Medford, Mass., have invented certain new and useful Improvements in Studs for Snap-Fasteners, of which the following is a specification.

This invention relates to the stud member of a snap fastener such as is commonly used in carriage work, as a fastening for side curtains, the stud being secured in the body of the vehicle and the socket member being affixed to the curtain.

Stud members for fasteners of this kind have heretofore been made with the part that is to stand projecting from the body made of a solid piece of metal turned to the proper form and having secured within it an attaching portion made from another piece of metal having a screw threaded shank to be screwed into the wood work of the body. Such construction is quite costly and there is some liability of the two parts becoming separated, or of the outer part being removed while the screw threaded attaching portion remains fastened in the body of the vehicle.

The object of the present invention is to produce a stud member of great strength and durability and at a less cost than heretofore.

Figure 1:
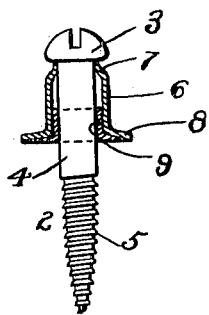
Figure 2:
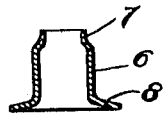
Figure 3:

Figure 1 is a longitudinal sectional view of a stud member embodying this invention; and Figs. 2 and 3 detached sectional views of some of the components thereof.

Referring to Fig. 1 the stud member comprises a main body portion or core 2 which is practically a wood screw of usual construction except that the head 3 is of proper shape to serve as the head of a stud fastener, being convex at its outer portion, which is slotted to be engaged by a screw driver, and having the outer circumferential part of the head rounded or convex instead of making a sharp angle with the under side of the head and made with accuracy as to the size or diameter of the head portion.

Below the head is a cylindrical shank portion 4, terminating in a screw threaded portion 5 preferably tapering or pointed as shown so as to be readily screwed into woodwork.

In order to insure the securing of the stud in the woodwork with the head at the proper distance therefrom, and to provide a suitable bearing for the socket member, a tubular barrel 6, Fig. 2 is provided, having a tubular body the internal diameter of which is somewhat greater than the diameter of the cylindrical portion 4 of the main screw piece and the external diameter of which is substantially the same as the maximum diameter of the head 3 of the screw piece.

One end of the tubular portion 6 is reduced as shown at 7 so as to fit closely around the shank of the screw piece beneath the head and thereby to afford in the complete article an annular groove at the base of the head 3 to coöperate with the usual latching portion of the socket member of the fastener.

At the other end the tubular portion 6 is provided with an outwardly turning flange 8 which forms a base for the part of the stud member that projects from the woodwork and serves as a stop to limit the entrance of the screw portion in the woodwork when the stud piece is fastened thereto, and also as a finish around the screw hole in the wood.

In order to center the tubular portion 6 upon the screw piece or core and to secure it thereto so that the entire construction can be handled as a unitary device, an ordinary flanged eyelet 9, Fig. 3 of proper size to fit snugly on the shank portion 4 of the main screw piece is applied with its tubular portion inserted within the tube 6, the parts being of proper size to have the eyelet 9 wedge tightly to the space between the shank 4 of the screw piece and the surrounding tubular barrel 6, the base flange 8 of which is made somewhat concave as shown to receive the flange of the eyelet 9 so that the flange 8 and the flange of the eyelet 9 make a substantially flat shoulder to rest snugly against the wood when the stud member is screwed into place.

The tubular body piece 6, like the eyelet 9, is of such character that it can be readily made by drawing from sheet metal, preferably brass, and thus can be produced at a very moderate cost, while the structure is very strong and substantial and is not likely to be broken away or damaged under the conditions incident to use.

What I therefore claim and desire to secure by Letters Patent is:

A stud member for snap fasteners comprising a main integral core having a convex head and a screw threaded shank of smaller diameter than the head, and a tubular barrel piece larger than the shank portion, and having one end reduced in diameter to fit the shank portion adjacent to the head, and having an outwardly extending flange at the other end, and an eyelet having its tubular body portion inserted between the shank of the core and the surrounding tubular barrel substantially as and for the purpose described.

In testimony whereof, I have signed my name to this specification.

GEORGE A. McCORMACK.